United States Patent [19]

Makinsky et al.

[11] 3,970,512

[45] July 20, 1976

[54] FALLING FILM EVAPORATOR

[76] Inventors: Ismail Zulfugarovich Makinsky, ulitsa Saratovtsa-Efima, 3/5, kv. 8; Samuil Petrovich Baksht, ulitsa Nizami, 129, kv. 13, both of Baku, U.S.S.R.

[22] Filed: Oct. 8, 1974

[21] Appl. No.: 513,172

Related U.S. Application Data

[63] Continuation of Ser. No. 170,151, Aug. 9, 1971, abandoned.

[52] U.S. Cl. ............................ 159/13 R; 159/13 B; 159/31
[51] Int. Cl.[2] ........................ B01D 1/22; B01D 1/00
[58] Field of Search ................ 202/173, 174, 185 A, 202/136; 203/11, 89; 159/5, 13, 13 A, 13 BB, 18, DIG. 17, 2 MS

[56] References Cited

UNITED STATES PATENTS

| | | | |
|---|---|---|---|
| 853,260 | 5/1907 | Passburg | 159/7 |
| 1,756,673 | 4/1930 | Baumann | 159/DIG. 17 |
| 2,514,943 | 7/1950 | Ferns et al. | 159/DIG. 17 |
| 2,803,589 | 8/1957 | Thomas | 159/DIG. 17 |
| 3,206,379 | 9/1965 | Hill | 159/13 R |
| 3,249,517 | 5/1966 | Lockman | 159/18 |
| 3,306,346 | 2/1967 | Othmer | 159/18 |
| 3,395,085 | 7/1968 | Kogan | 159/DIG. 17 |
| 3,434,935 | 3/1969 | Habendorff et al. | 202/236 R |
| 3,498,886 | 3/1970 | Waller et al. | 159/18 |
| 3,503,853 | 3/1970 | Taubert et al. | 159/DIG. 17 |
| 3,505,172 | 4/1970 | Achener | 202/236 X |
| 3,619,378 | 11/1971 | Ricard | 202/236 |
| 3,755,088 | 8/1973 | Osdor | 159/18 |
| 3,859,173 | 1/1975 | Barckhausen | 202/236 |

*Primary Examiner*—Jack Sofer
*Attorney, Agent, or Firm*—Haseltine, Lake & Waters

[57] ABSTRACT

The invention relates to evaporators of adiabatic or "instantaneous" boiling for distilling sea water. According to the invention, the evaporator, substantially for a distiller, is characterized in that it comprises a housing accomodating pipelines with slot-like nozzles used for feeding superheated water onto an evaporating surface accomplished by plates positioned within the housing at an acute angle to its vertical plane. These plates provide for film evaporation of the overheated water. Mounted in the housing on the path of movement of the vapor are gravitational-kinetic traps to catch the liquid particles carried away by the vapor.

4 Claims, 4 Drawing Figures

FALLING FILM EVAPORATOR

This application is a continuation application of Ser. No. 170,151; filed Aug. 9, 1971 now abandoned.

The present invention relates to devices for producing distillate by means of overheated liquid and, more particularly, the invention relates to evaporators, substantially for a distiller, operating on sea water.

In the known evaporators comprising a housing with an evaporating surface, in which superheated water is fed through the nozzles of a pipeline, the vapor is produced due to evaporation of the water from the horizontal surface of the liquid or directly from the flow of liquid, in which case the vapor moving upwards is fed through a louver separator into a superheated condenser.

Since the process of evaporation of overheated water from the flow or the horizontal surface thereof runs vigorously and with splashing of the liquid, the vapor moving upwards catches particles of the liquid being evaporated, and the quality of the obtained distillate is considerably deteriorated. The poor quality of the distillate also results from the decomposition of the flow of superheated liquid and converted into drops, the splashing of the water, and the impact of the flow with the surface of the liquid as well as due to poor washing as it not always possible to bubble the vapor with distilled water due to high steam-dynamic resistance of the washing, which fact is a great importance under the conditions of a high vacuum. On the other hand, the washing of vapor with flows of liquid is ineffective.

Owing to this fact the known modern adiabatic vacuum evaporators produce distillate having 5 to 100 mg of salts per liter of distillate. Such distillate cannot be used in high-pressure steam generators, since for this purpose the content of salts must not exceed 0.3 mg/l. To obtain this content it is necessary to use secondary distillation or additional desalination of the water by the method of ion exchange which complicates the plant and increases the cost of distillate.

Furthermore, due to high vertical velocities of the vapor allowable in the modern evaporators, their weight dimensions and cost are considerable, particularly in the case of a high vacuum.

An object of the present invention is to eliminate the above-mentioned disadvantages.

The main object of the invention is to provide an evaporator which due to the use of a novel evaporating surface and a gravitational-kinetic trap is capable of producing high-purity distillate for feeding a high-pressure steam generator without application of secondary distillate or desalination by the method of ion exchange, while having a low weight and dimensions.

This object is attained due to the fact that in the proposed evaporator, substantially for a distiller, according to the invention, the evaporating surface is made in the form of plates disposed within the housing at an acute angle to its vertical plane and fed with superheated water running through the nozzles of a pipeline, which water is film-evaporated from the surface of the plates, while the vapor produced due to the evaporation passes through gravitational-kinetic traps catching the drops of liquid carried by the vapor.

The plates used for the process of film evaporation are preferably arranged in the housing in rows or stages, and the nozzles of the pipelines used for feeding superheated water are preferably slotted.

The gravitational-kinetic traps are preferably made in the form of troughs with perforate bottoms located one above the other and used for supplying the washing distillate therefrom. The traps comprise horizontal louvers 5 placed between the superposed troughs at their vapor-receiving sides and declined to deflect droplets into the troughs, through which louvers the steam and the liquid particles carried thereby are thus fed into the gravitational-kinetic trap.

The perforations in the troughs are preferably arranged in staggered manner.

The proposed evaporator provides for a minimum content of liquid drops within the vapor produced, because, as it has been found from experiments, the process of evaporation of the liquid on the plates runs smoothly.

The use of the gravitational-kinetic traps and the moving in a horizontal direction allow one to separate liquid drops of any diameter.

The above-mentioned advantageous construction of the proposed evaporator in combination with the circulating system of washing distillate, the output of which is 5 to 10 times as great as the output of the evaporator, make it possible to produce high-purity distillate, i.e. with a content of salts less than 0.3 mg/l, when distilling sea water, and this, in turn, makes it possible to use the distillate directly for feeding high-pressure steam generators without secondary distillation or desalination of the water by the method of ion exchange.

Due to the multistage distribution of the superheated water and the surfaces of the plates employed for film evaporation, the vapor velocity may be high and this fact makes it possible to reduce the dimensions of the evaporator, the consumption of metal for its manufacture and its cost by a factor of 6 to 8 as compared with the known constructions of the evaporators operating under the same conditions.

The invention will be better understood from the following detailed description of one embodiment of the invention, reference being made to the accompanying drawings, in which.

Figure 1:
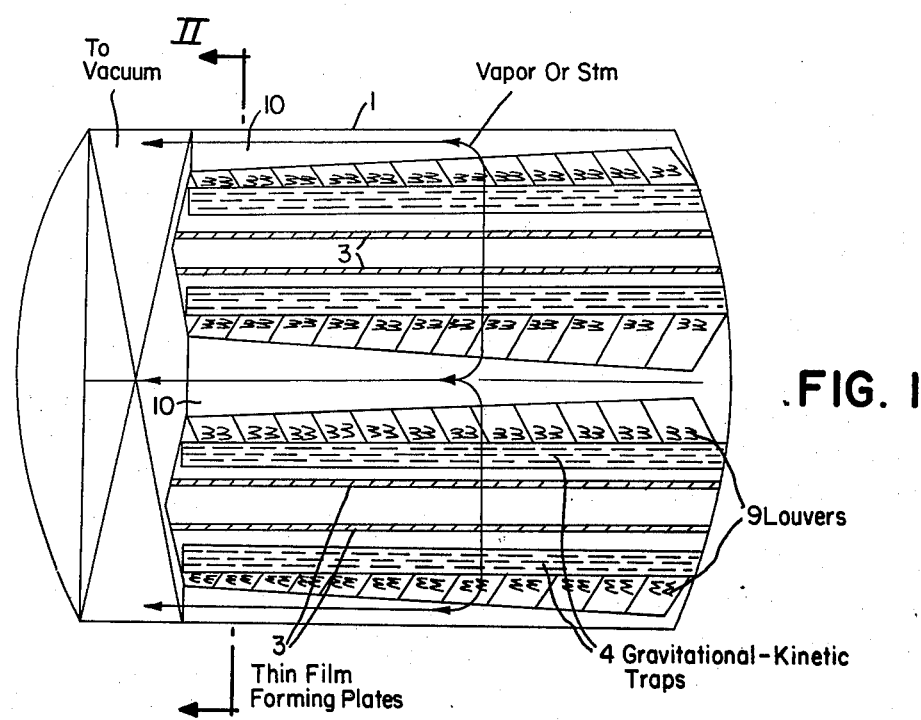
FIG. 1 shows a horizontal section through an evaporator according to the invention.
Figure 2:
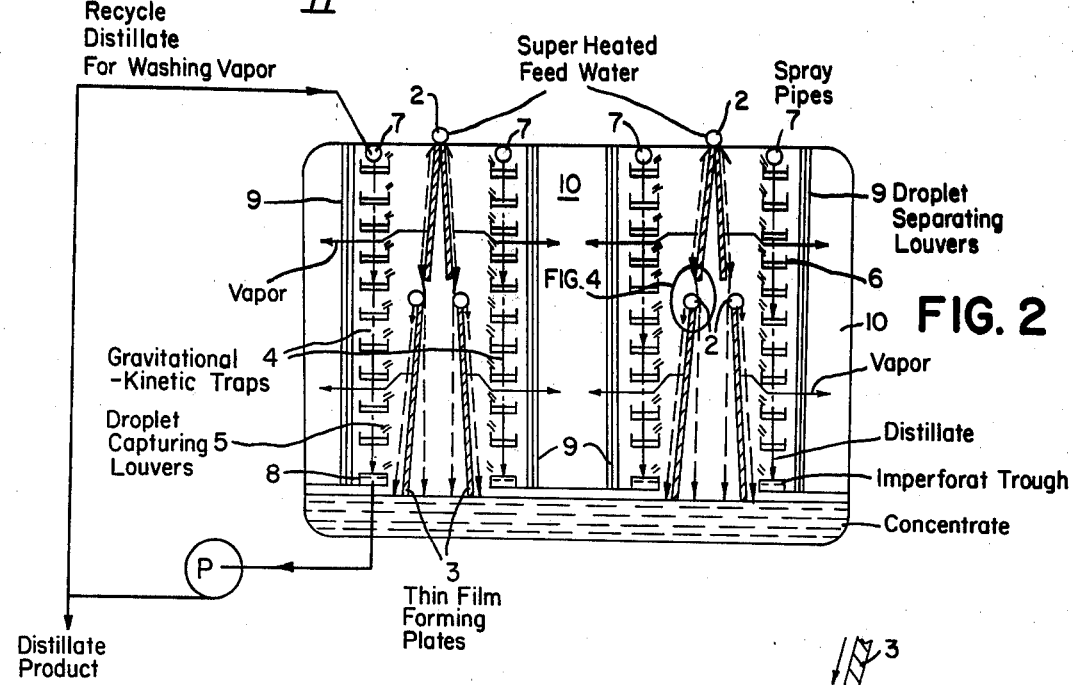
FIG. 2 is a sectional view taken along the line II—II in FIG. 1.
Figure 3:
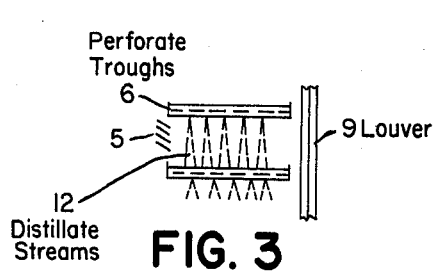
FIG. 3 is a view of the gravitational-kinetic trap of the evaporator to an enlarged scale.
Figure 4:
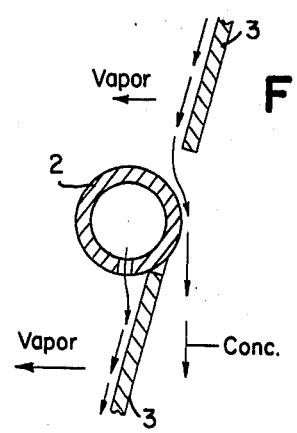
FIG. 4 is a enlarged fragmentary sectional view of the circled portion in FIG. 2.

As seen from FIGS. 1, 2, 3, the evaporator comprises a housing 1 accomodating pipelines 2 feeding superheated water through slotted nozzles onto the sides of the plates 3 facing the troughs, from which the film of superheated liquid is subjected to evaporation.

The plates 3 are disposed within the housing 1 in rows or stages located at an acute angle to its vertical plane.

The plates 3 of a lower stage are somewhat displaced outwardly relative to the plates 3 of the upper stage, thus providing for downflow of the liquid.

Located in the path of movement of the vapor in the housing 1 are gravitational-kinetic traps 4 consisting of a system of louvers 5 and horizontal troughs 6 located one above the other.

In the floors of the troughs 6 there are provided perforations disposed in a staggered order, the troughs being superimposed and aligned.

Located above the upper trough 6 are pipelines 7 feeding the washing distillate into the gravitational-kinetic traps 4.

The lower trough 8 is used for removing the washing distillate.

Disposed downstream of the gravitational-kinetic traps 4, as viewed in the direction of movement of vapor indicated by arrows in FIGS. 1 and 2, are louver separators 9.

The housing 1 of the evaporator is provided with horizontal passageways 10 and vertical passageway 11 for passing the vapor into the vapor condenser (not shown).

The evaporator operates as follows.

The superheated water is fed through the pipelines 2 arranged in stages, at the tops of the superposed plates 3 of the evaporator 1 and each of said pipes having a decreasing section along its length for uniform distribution of the superheated water in the housing 1 of the evaporator. Through the slotted nozzles in the pipelines 2 the superheated water is fed onto the plates 3 along which the water flows down as a thin film and partially evaporates during this movement. The evaporation is effected due to the fact that a vacuum is maintained within the housing 1 of the evaporator, while the temperature within the housing 1 is lower than the temperature of the water fed therein. The evaporation takes place only from the metal plates 3, thereafter, the water runs down and feeds onto the inner surface of the plates 3 of the lower stage while further liquid to be evaporated flows via another pipe 2 onto the outer surface of the next lower plate 3. The vapor produced during the film evaporation from the surface of the plates 3 moves directly away therefrom within the chamber 1 of the evaporator only horizontally, while at the inlet of the gravitational-kinetic traps 4 it moves through the louvers 5 at a declined angle to the horizontal.

The washing distillate is fed through the pipes 7 onto the upper trough 6 of the gravitational-kinetic trap 4 through the openings in undersides of the pipes 7.

From the upper trough 6 of the gravitational-kinetic trap 4 the washing distillate is successively fed through the perforations in the bottoms of the troughs 6 through all the troughs 6. From the lowermost trough 8 having no perforations the washing distillate and captured droplets are fed to the input of a washing pump which directs the distillate again into the pipes 7.

The liquid particles carried away by the vapor settle on the surface of the washing distillate in the troughs 6 under the effect of gravity as well as under the action of the kinetic energy which they acquire at the output of the louvers 5.

The louvers 5 are selected so as to provide uniform discharge of vapor throughout the height of the gravitational-kinetic traps 4.

In addition, the vapor is also washed by the streams 12 of distillate. The washed vapor is separated in a vertical louver separator 9, while the separated liquid and captured droplets flow down.

The separated vapor is directed through horizontal passageways 10 into a vertical passageway 11 connecting the separator with a vapor condenser.

Each horizontal passageway 10 has a section widening along the path of the vapor for providing uniform distribution of vapor along the length of the evaporator.

We claim:

1. An evaporator, substantially for a distiller, comprising in combination: a housing accomodating horizontal pipelines having nozzle openings on their undersides for feeding superheated water to be treated therethrough; an evaporating surface including a plurality of inclined plates disposed within said housing and defining an acute angle to the longitudinal vertical plane thereof, the superheated water being fed through the nozzle openings onto the upper edges of said plates through the nozzle openings of said pipeline for being subjected to film evaporation from the surfaces of said plates; and gravitational-kinetic traps comprising a plurality of horizontal, superposed parallel perforated troughs with perforate undersides mounted in said housing in the path of the horizontal movement of the vapor produced due to later withdrawal of same from said film evaporation of the superheated water, said traps providing for catching the entrained liquid particles carried away by the vapor.

2. An evaporator as claimed in claim 1, said plates providing for film evaporation of the superheated water being arranged within said housing in superposed stages, and said nozzle openings of the pipelines having the superheated water fed therethrough onto the plates, being formed as slots.

3. An evaporator as claimed in claim 1, said perforated troughs being adapted to convey and spray washing distillate; and horizontal louvers being disposed between the troughs and the plates at an angle downwardly inclined toward the troughs so as to deflect droplets thereinto and through which the vapor and entrained liquid particles are fed into the gravitational-kinetic traps.

4. An evaporator as claimed in claim 3, said perforations in the troughs being located in a staggered relationship.

* * * * *